(12) United States Patent
Gombert et al.

(10) Patent No.: US 6,359,735 B1
(45) Date of Patent: Mar. 19, 2002

(54) ANTIREFLECTIVE COATING AND METHOD OF MANUFACTURING SAME

(75) Inventors: Andreas Gombert, Fehrenbachallee; Hansjorg Lerchenmuller, Obertal, both of (DE)

(73) Assignee: Fraunhofer Gesellschaft zur Forderung der Angewandten Forschung E.V. (DE)

( * ) Notice: Subject to any disclaimer, the term of this patent is extended or adjusted under 35 U.S.C. 154(b) by 0 days.

(21) Appl. No.: 09/355,871

(22) PCT Filed: Jan. 14, 1998

(86) PCT No.: PCT/DE98/00117

§ 371 Date: Sep. 15, 1999

§ 102(e) Date: Sep. 15, 1999

(87) PCT Pub. No.: WO98/39673

PCT Pub. Date: Sep. 11, 1998

(30) Foreign Application Priority Data

Mar. 4, 1997 (DE) .......................... 197 08 776

(51) Int. Cl.⁷ .............................. G02B 1/11; G02B 1/12
(52) U.S. Cl. ...................... 359/580; 359/581; 428/156; 428/410; 428/426; 65/31
(58) Field of Search ................. 359/580, 581; 428/156, 333, 410, 426; 65/31

(56) References Cited

U.S. PATENT DOCUMENTS

| | | |
|---|---|---|
| 4,153,654 A | 5/1979 | Maffitt et al. |
| 4,511,614 A | 4/1985 | Greeson et al. |
| 4,798,994 A * | 1/1989 | Rijpers et al. ............... 313/478 |
| 4,944,986 A | 7/1990 | Zuel |
| 5,120,605 A * | 6/1992 | Zuel et al. .................. 428/410 |

FOREIGN PATENT DOCUMENTS

| | | |
|---|---|---|
| DE | 31 21 785 A1 | 12/1982 |
| DE | 38 31 503 A1 | 3/1990 |
| WO | WO 95/31737 * | 6/1994 |

* cited by examiner

*Primary Examiner*—Daniel Zirker
(74) *Attorney, Agent, or Firm*—St. Onge Steward Johnson & Reens LLC

(57) ABSTRACT

What is described here is an antireflective coating comprising a carrier layer consisting of an optically transparent material, which, at least on one surface side, presents antireflective properties with respect the wavelengths of the radiation incident on the surface. Moreover, methods of producing the coating are described.

The invention excels itself by the provision that the antireflective surface side presents a surface roughness with stochastically distributed structures—the so-called macro structures—and that the macro structures are additionally modulated with surface structures presenting a periodic sequence—the so-called micro structures—which present period or cycle lengths smaller than the wave lengths of the radiation incident on the antireflective surface.

19 Claims, 2 Drawing Sheets

ANTIREFLECTIVE COATING AND METHOD OF MANUFACTURING SAME

FIELD OF THE INVENTION

The invention relates to an antireflective coating comprising a carrier layer consisting of an optically transparent material, which presents, at least on one surface side, antireflective characteristics in view of the wavelengths of radiation incident on the surface. Moreover, inventive methods of manufacturing the antireflective coating are disclosed.

PRIOR ART

At the interfaces of transparent media such as glass or synthetic panes, which are preferably used for windows, screens or instrument display surfaces, one part of the light incident on the interfaces is always reflected, i.e. reflected back into the space. As a result of the reflection phenomena occurring on the interface of the transparent media the transparency characteristics as well as the reading suitability of screens or displays are substantially impaired. For an improvement of the transparency properties or the reading suitability of screens of any kind in general antireflection measures are known which take each a different influence on the reflective characteristics at the interfaces.

For instance, reflecting surfaces may be subjected to an antireflection treatment by providing their surface with a suitable roughness. Even though the roughening of the interface surface causes a reflection of the same share of the incident light back into space any light beams incident in parallel onto the surface are reflected in various directions as a result of surface roughness. In this manner, clear mirror images are avoided, which means that light sources which would be normally reflected with sharp edges imaged on the interface, merely result in a fairly homogeneous brightening on the roughened surface. In this manner, strong differences in luminosity are avoided and the reflections are felt to be by far less troublesome.

This kind of antireflection treatment has been successfully employed, for instance, on displays characterised by the term "antiglare coating". An essential advantage of this antireflection technique is the suitability for copy moulding of the structures by low-cost stamping processes. The disadvantage of this kind of antireflection treatment resides, however, in the aspect that the hemispheric reflection, i.e. the sum of reflecting and diffuse reflection into the total rear space region is not increased in the most expedient case, so that the background brightness of screen glass surfaces so prepared is comparatively high. This results not least in a substantial reduction of the contrast of an eye or display present behind such an antiglare coating.

Another possibility of antireflection treatment of optical surfaces consists in the application of appropriate interference layers. In that technique the surface to be subjected to antireflection treatment is coated with one or several thin layers having a suitable refractive index and an appropriate thickness. The structure of the interference layer is so configured that destructive interference phenomena occur in the reflected radiation field in suitable wavelength ranges, so that reflexes from light sources are strongly reduced in terms of their brightness. However, their image remains sharp in the reflected optical path, in distinction from the aforementioned antiglare layer. Even with a visual residual reflection of <0.4% the sharp mirror images produce sometimes a more troublesome effect than the comparatively high brightness of antiglare surfaces. The contrast ratio is good. For the majority of screens and further applications, however, interference layers are too expensive from a manufacturing point of view.

A third alternative of antireflection treatment of optical surfaces consists in the introduction of so-called subwavelength grids, which leads to a gradient of the refractive index at the interface of an optically transparent medium, so that an optical effect is produced which resembles that of interference layers. Such a gradient of refractive indices is realised by surface structures if the structures are smaller than the wavelengths of the incident light. Die production of periodic structures by means of holographic exposure in a photo resist layer applied on the surface of a transparent medium is expediently suitable to this end.

Examples of such sub-wavelength grids may be taken from the prior art documents DE 38 31 503 C2 and DE 2 422 298 A1.

Such sub-wavelength surface grids presenting periods of 200 to 300 nm are suitable for wide-band reflection reduction. Such surfaces, which are also known by the term "moth-eye antireflection surfaces", are described in details in an article by M. C. Hutley, S. J. Willson, "The Optical Properties of Moth-Eye Antireflection Surfaces", in: OPTICA ACTA, 1982, vol. 29, No. 7, pages 993–1009. Even though the substantial advantage of such "moth-eye layers" resides in the manufacturing technique which can be reproduced by means of stamping processes at reasonable costs and which resemble those of antiglare structures, the large-area production of such structures is very difficult in view of the very narrow tolerance ranges in optics in view of the variance of structure depths and a very high aspect ratio, i.e. a very high ratio between the structure depth and the period of the structures, which may give rise to adulterating colour effects. Moreover, the images of light sources are imaged on surfaces so processed, in the reflected image as sharply as in the case of interference layers.

BRIEF DESCRIPTION OF THE INVENTION

The present invention is based on the problem of improving an antireflective coating comprising a carrier layer consisting of an optically transparent material, which presents, at least on one side, antireflective properties in view of the wavelengths of the radiation incident on the surface, in such a way that particularly in application on screen surfaces the contrast ratio will be substantially not impaired by the reflective properties at the optical interface. Discrete reflection images such as those occurring in interference layers and reflections on sub-wavelength grids should be avoided. The inventive antireflective coating should particularly present hemispherical reflective characteristics whose degree of reflection is by far below that of normal antiglare layers. Moreover, a method should be provided for manufacturing the inventive antireflective coating, which is also suitable for producing large-area antireflective coatings, despite low manufacturing costs.

The solution to the problem underlying the invention is described in claim 1. Claim 7 relates to an inventive manufacturing method. The dependent claims contain each the features expediently improving the respective inventive ideas.

In accordance with the invention an antireflective coating comprising a carrier layer consisting of an optically transparent material, which presents, at least on one surface side, antireflective properties with respect to the wavelengths of the radiation incident on the surface, is so configured that the antireflective surface side has a surface roughness with stochastically distributed structures—so-called macro structures—and that the macro structures are additionally modulated with periodically sequenced surface structures—the so-called micro structures—which have cycle or period lengths which are smaller than the wavelengths of the radiation incident on the antireflective surface.

The present invention is based on the idea of combining the advantages of the reflective properties of the aforedescribed known antiglare layers with the characteristics of sub-wavelength grids. On account of the superimposition of macro structures and micro structures on one and the same optical surface firstly discrete reflection images are prevented on account of the macro structures, and secondly the share is dramatically reduced by hemispheric reflection on the surface on account of the micro structures. In particular in the application on monitor display surfaces the inventive antireflective coating results in a substantial increase of the contrast conditions, a large destruction of mirror image reflections, and a decisive reduction of hemispheric and reflecting reflection.

Due to the inventive superimposition of macro and micro structures a large-area production of the inventive reflective image is equally possible, in distinction to the "moth-eye structures" known per se, specifically since the speckle which occurs on major areas provided only with moth-eye structures is actually camouflaged, i.e. pushed optically into the background, due to the macro structure and the diffuse surface properties linked up therewith.

In order to achieve the desired effect of diffuse reflection by the macro structures, structures with an average structure size typically in the range of 10 to 100 times the wavelength of the radiation incident on the surface must be statistically distributed over the surface of the antireflective coating. Due to the purely statistical distribution of the macro structures the antireflective coating is provided with a surface roughness which causes a complete diffuse reflection of the radiation incident on the surface. In an approach to avoid the disadvantages of the aforedescribed unreduced hemispheric reflection the diffusely reflected radiation shares enter into a destructive interference, in a way resembling the reflection on interface layers, on account of the additional micro structures provided on the surface, which present a typical period or cycle length of less than 250 nm and a typical structure depth of more than 100 nm. Due to the destructive interference phenomena the hemispheric reflection properties of the inventive antireflective coating are substantially improved, which leads to improve contrast conditions particularly in applications on screen surfaces or instrument displays. Moreover, the application of the inventive antireflective coating is particularly well suitable for solar applications such as the glazing of solar cells or similar systems operating on the photo-voltaic effect.

Due to the preferred embodiment of the antireflective coating on a carrier film which may be configured, for instance, to be adhesive on one side, it is possible to fix the coating on the most different optical systems for many different applications. The antireflective coating is particularly well suitable for liquid-crystal displays and screens where the coating may be combined with a polarizer to form a single film. Measurements of reflection have shown that the inventive antireflective layer permits a visual reduction to distinctly less than 1% in terms of both direct and hemispheric reflection.

Apart from the use of films as transparent carrier layer the inventive antireflective coating may also be applied on glass substrates directly, which are used, for instance, as display surface of a monitor or any other instrument display.

Moreover, in accordance with the invention a method is disclosed for the production of an antireflective coating comprising a carrier layer consisting of an optically transparent material, which presents, at least on one surface, antireflective characteristics with respect to the wavelengths of the radiation incident on the surface, which method is so designed that it comprises a combination of the following steps:

In a first step, at least one surface of a plane substrate is provided with a stochastically distributed surface structure, the so-called macro structures.

The macro structures are applied either mechanically, chemically or by means of a photo resist layer, which is exposed in an appropriate form. In an alternative, it is also possible to coat the substrate surface with a coating which presents or forms a surface roughness in the desired form.

Moreover, a photo resist layer is applied on the aforementioned pre-treated substrate surface, unless a photo resist layer had been applied there already, which photo resist layer is exposed to an interference pattern by the superimposition of two coherent wave fields so that surface structures with a periodic sequence are produced, the so-called micro structures. The photo resist layer so exposed is subsequently developed. Then the substrate surface presenting macro and micro structures is moulded on a stamping matrix by means of which the carrier layer, which consists of an optically transparent material, is structured by a stamping process.

The production of the macro structure on a substrate surface may be realised by mechanical means, preferably by means of sand blasting, shot-peening with glass beads, or lapping, i.e. by means of fine grinding methods resulting in the desired surface roughening.

In addition to the mechanical roughening methods, wet chemical etching processes, for instance, are alternative means for providing the substrate surface with the desired roughness. Moreover, depositions of layers on the substrate surface, which present the desired surface roughness values, may lead to the macro structures.

In addition to the direct treatment of the substrate surface the application of a photo resist layer on the substrate surface provides another alternative method of manufacturing the macro structure. The thickness of the photo resist layer to be applied must be selected to exceed the achievable depth of structure which is obtained in the superimposition of the macro structures and micro structures. On the one hand, it is thus possible to obtain a stochastic distribution of structures on the photo resist layer by incoherent or coherent exposure of the photo resist layer, using halftone screen masks. As an alternative or in addition to the aforementioned exposure variant it is also possible to include speckle patterns into the photo resist layer by exposure. To this end diffuser glass plates are suitable which are irradiated with coherent light. The photo resist layer so pre-exposed can be developed in this stage, which produces a stochastically distributed height profile, the so-called macro structure, on the photo resist layer which has a sufficient thickness, as has been described in the foregoing.

It is equally possible to subject the photo resist layer, exposed in the aforedescribed manner, to a further exposure step without intermediate development, so as to incorporate the micro structure into the surface by exposure. Employing two superimposed coherent wave fields, the pre-exposed photo resist layer, which is possibly also pre-processed in an appropriate manner, is exposed with the interference pattern which results from superimposition, so that a periodic sequence of so-called micro-structures is produced on the stochastically distributed surface structure.

In a way resembling the principle of the modulated carrier frequency, which is known from the technique of transmission of electromagnetic waves, a micro structure is modulated onto the macro structure by the methodology described above. A subsequent development process exposes the entire macro and micro structures on the photo resist layer in a three-dimensional way, provided that the exposure step for the production of the three-dimensional macro structure has not yet been performed.

The surface structure so obtained is then transferred to a metal master, which consists of nickel in a typical case, in a subsequent, preferably galvanic copy moulding process. The metal master or copies of the metal master are used as stamping dies for subsequent stamping processes. In these subsequent stamping processes the inventive surface structures are transferred to carrier layers, for instance by thermoplastic shaping or by UV hardening, which carrier layers are typically produced in the form of films or foils. Organic or inorganic coatings or even solid polymers offer themselves in addition to films.

BRIEF DESCRIPTION OF THE DRAWING

The invention will now be described in the following, without any restriction of the general inventive idea, by exemplary embodiments with reference to the drawing which explicit reference is made to with respect to the disclosure of all inventive details which are not explained in more details in the text, by the way. In the drawing.

BRIEF DESCRIPTION OF ONE EMBODIMENT

Figure 1:
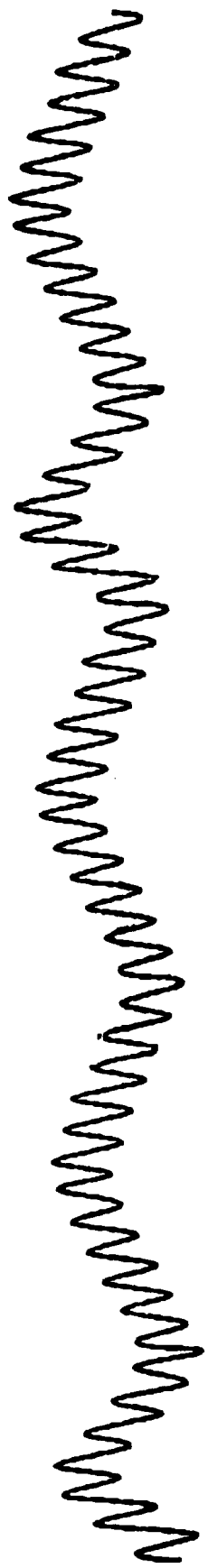
FIG. 1 is a schematic view of the inventive surface structure.

The merely schematic illustration in FIG. 1 shows a surface profile in a cross-sectional view of the inventive antireflective layer. The macro structure is subjected to a stochastic—i.e. non-homogeneous—distribution and, in analogy with the technique of transmission of electromagnetic waves, it corresponds to the form of a carrier wave on which the surface structure illustrated in FIG. 1 may be superimposed. The micro structure is quasi modulated onto the carrier wave or the macro structure, respectively.

Figure 2:
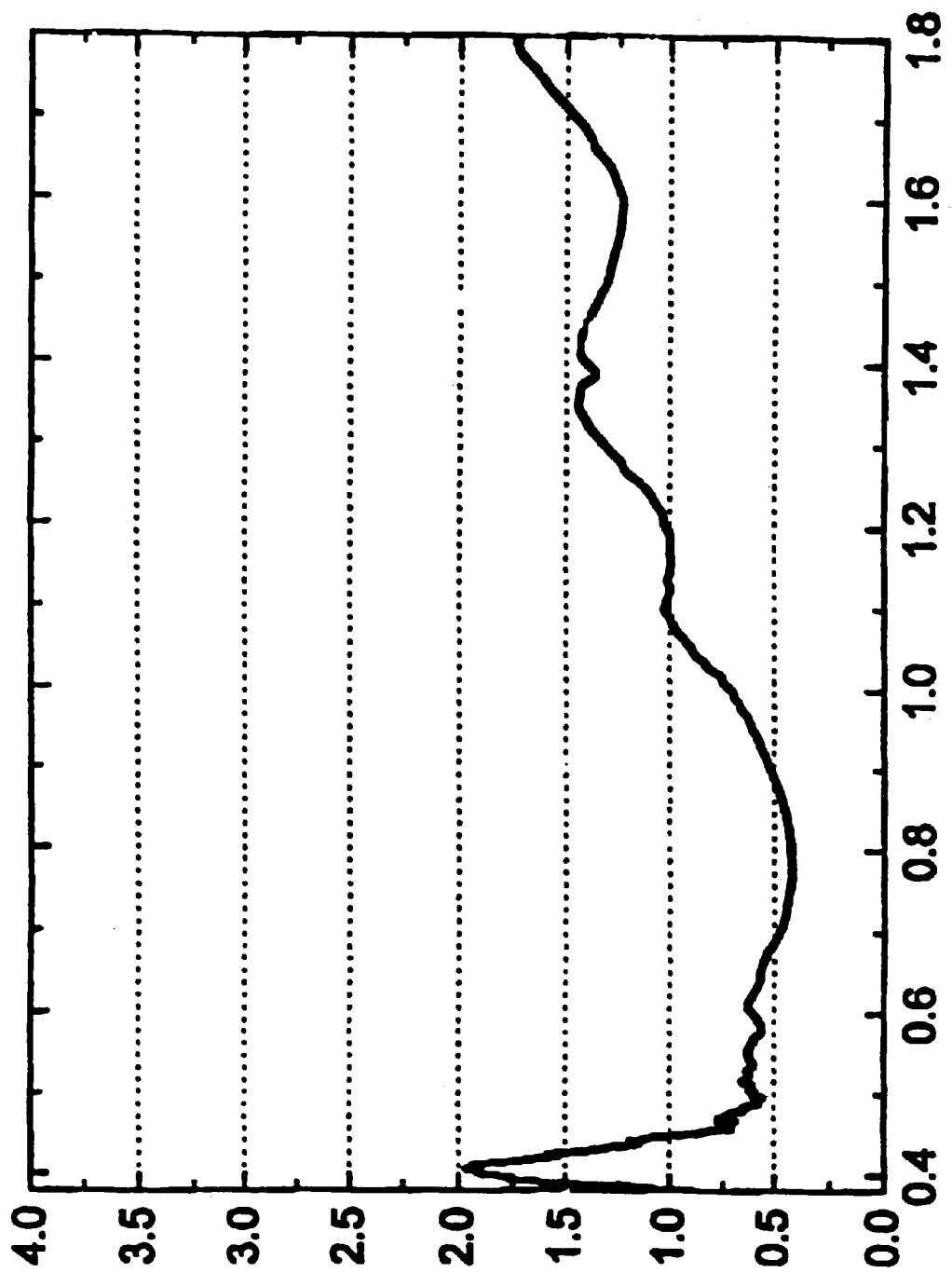
FIG. 2 illustrates the hemispheric reflection in the form of a diagram, on a substrate/air interface subjected to an antireflective treatment according to the inventive method.

FIG. 2 shows a diagram which corresponds to a measurement for measuring the reflective properties of an optically transparent medium having a refractive index of 1.6. What can be clearly recognised is the fact that the hemispheric reflection is definitely lower than 2% over the entire range of wavelengths in the visible range as well as in the joining infrared range. Comparative measurements with mere antiglare antireflective layers have gone to show that these are higher than the measured values indicated in FIG. 2 by several orders of magnitudes.

What is claimed is:

1. Antireflective coating comprising a carrier layer consisting of an optically transparent material, at least on one surface of said carrier layer presenting antireflective properties with respect to at least one wavelength of radiation incident upon said surface, said antireflective surface having a surface roughness formed by statistically distributed macro structures modulated with a periodic sequence of micro structures having a period length smaller than said at least one wavelength of radiation.

2. Antireflective coating according to claim 1, characterized in that said macro structures have a mean structure size in the order of 10 to 100 times said at least one wavelength of incident radiation.

3. Antireflective coating according to claim 1, characterized in that said carrier layer is produced in the form of a film.

4. Antireflective coating according to claim 1, characterized in that said film is configured to be adhesive on one side.

5. Antireflective coating according to claim 1, characterized in that the period length of said micro structure is smaller than 250 nm.

6. Antireflective coating according to claim 1, characterized in that the structure depth of said micro structures exceeds 100 nm.

7. Antireflective coating according to claim 1, characterized in that said periodic sequence is the same as that of an interference pattern formed by two superimposed coherent wave fields.

8. Method of manufacturing an antireflective coating comprising a carrier layer consisting of an optically transparent material having at least one surface which is antireflective for incident radiation having at least one wavelength comprising the steps of:

creating statistically distributed macro structures on a surface of a planar substrate by
roughening a surface of said planar substrate by mechanical or chemical means to create corresponding statistically distributed macro structures; or
providing a surface of said planar substrate with a coating which forms or has corresponding statistically distributed macro structures; or
coating a surface of said planar substrate with a photoresist layer and exposing said layer so that corresponding statistically distributed macro structures are formed after development of said photoresist layer;

applying to the surface of said planar substrate a photo resist layer, unless such layer has already been applied, exposing said layer to an interference pattern formed by superposition of two coherent wave fields to create surface micro structures having a periodic sequence, developing said exposed photo resist layer;

copy-molding the substrate surface including said macro and micro structures onto a stamping matrix and structuring the carrier layer by stamping with said stamping matrix in the course of a stamping process.

9. Method according to claim 8, characterised in that said mechanical process of surface roughening is performed by means of sand blasting or shot-peening with glass beads.

10. Method according to claim 8, characterised in that said surface roughening is performed by lapping or grinding of the surface.

11. Method according to claim 8, characterised in that said chemical surface roughening process is performed by means of wet chemical etching.

12. Method according to claim 8, characterised in that a sol-gel layer is applied onto the surface.

13. Method according to claim 8, characterised in that for creation of said macro structure the surface of said planar substrate, which is coated with a photo resist layer, is subjected to exposure by means of a screen mask presenting a halftone distribution.

14. Method according to claim 8, characterised in that for creation of said macro structure the surface of said planar substrate, which is coated with a photo resist layer, is subjected to exposure using a speckle pattern including a stochastic distribution of intensities.

15. Method according to claim 14, characterised in that said speckle pattern is generated by means of trans-illumination of a diffuser glass plate with coherent light.

16. Method according to claim 8, characterized in that the copy moulding of said substrate surface presenting said macro and micro structures onto the stamping matrix is performed by means of galvanic shaping.

17. Method according to claim 8, characterized in that said stamping process is performed by means of thermoplastic stamping or stamping with radiation hardening.

18. Method according to claim 8, characterized in that said stamping process performed on said substrate surface presenting said macro and micro structures onto the stamping matrix is performed by means of an injection moulding technique.

19. Method according to claim 17, characterized in that said stamping with radiation hardening is performed by means of UV hardening.

\* \* \* \* \*